United States Patent [19]

Hiratani et al.

[11] Patent Number: 4,645,726
[45] Date of Patent: Feb. 24, 1987

[54] SOLID STATE LITHIUM BATTERY

[75] Inventors: Masahiko Hiratani, Kokubunji; Katsuki Miyauchi, Hino; Yukio Ito; Keiichi Kanehori, both of Sayama; Fumiyoshi Kirino, Sugunami; Tetsuichi Kudo, Setagaya, all of Japan

[73] Assignee: Hitachi, Ltd., Tokyo, Japan

[21] Appl. No.: 800,432

[22] Filed: Nov. 21, 1985

[30] Foreign Application Priority Data

Nov. 26, 1984 [JP] Japan .................. 59-248240

[51] Int. Cl.$^4$ .................. H01M 4/40; H01M 6/18
[52] U.S. Cl. ...................... 429/191; 429/218
[58] Field of Search .............. 429/191, 192, 193

[56] References Cited

U.S. PATENT DOCUMENTS 4,525,440  6/1985  Barnette et al. .............. 429/191

FOREIGN PATENT DOCUMENTS 0143268  8/1984  Japan .............. 429/191

Primary Examiner—Donald L. Walton
Attorney, Agent, or Firm—Antonelli, Terry & Wands

[57] ABSTRACT

A compact, light-weight all solid state lithium battery is disclosed. The battery provides a good contact between a solid electrolyte and a Li anode by forming a Li alloy layer therebetween, even at the time of discharge at a large current density.

6 Claims, 4 Drawing Figures

SOLID STATE LITHIUM BATTERY

BACKGROUND OF THE INVENTION

This invention relates generally to an all solid state lithium battery, and more particularly to an all solid lithium battery of the type in which a lithium alloy layer is disposed between a solid electrolyte and a lithium anode.

A lithium (Li) electrode in conventional all solid state lithium batteries (hereinafter called simply the "lithium battery") is formed by either bonding directly a lithium foil to a solid electrolyte or by forming the lithium foil by evaporation on the solid electrolyte. In the Li anode of this kind, however, with the increase in the discharge current density of a battery, the quantity of consumed Li on the interface between the solid electrolyte and the Li anode exceeds the quantity supplemented by the diffusion of the Li atoms so that voids are formed in the Li anode on the interface between the solid electrolyte and the Li anode and hence the Li anode peels off. One of the methods of solving this problem is described in T. R. Jow and C. C. Liang, Solid State Ionics, 9, 10, 695 (1983), "Interface between Solid Anode and Solid Electrolyte-Effect of Pressure on Li/LiI (Al$_2$O$_3$) Interface". This method brings the Li anode into constant and close contact with the solid electrolyte by an external pressure, crushes and extinguishes the voids that are formed with the increase in the discharge current density of the battery, and keeps a satisfactory contact between the solid electrolyte and the Li anode.

However, this method has the problem that a mechanism for applying constantly and continuously a large pressure of at least 400 kg/cm$^2$ to the battery is necessary in order to keep the satisfactory interface contact between the solid electrolyte and the Li anode consequently, the method is not entirely suitable for reducing the size or thickness of the Li battery.

SUMMARY OF THE INVENTION

It is an object of the present invention to provide an improved all solid state lithium battery.

It is another object of the present invention to provide an all solid state lithium battery which can prevent the formation of voids between a lithium anode and a solid electrolyte.

It is still another object of the present invention to provide an all solid state lithium battery which can charge and discharge at a high current density.

In an all solid state lithium battery consisting of a cathode, a solid electrolyte and a lithium anode, these and other objects of the invention can be accomplished by an all solid lithium battery which is characterized in that a lithium alloy layer is disposed between the solid electrolyte and the lithium anode.

DESCRIPTION OF THE PREFERRED EMBODIMENTS

Lithium metal can easily make alloys with other metal elements at room temperature. Particularly, a certain phase of Li alloys containing Al, Ga, In, Si, Sb, Bi or the like has by far a larger chemical diffusion coefficient at room temperature when compared with the self-diffusion coefficient of Li. The present invention have completed on the basis of the technical concept that if a lithium battery having a solid electrolyte—a lithium alloy—lithium metal structure is constituted by forming the Li alloy layer on a lithium anode surface which is in contact with the solid electrolyte, the contact on the interface between the solid electrolyte and the Li alloy will be supplemented by a tast diffusion of the lithium atoms in the Li alloy even in the discharge at a high current density, while the contact on the interface between the lithium alloy and the lithium metal will be kept by high chemical reactivity, that is, peeling of the Li anode due to the formation of voids will not occur on any of the interfaces between the solid electrolyte/Li alloy, and Li alloy/Li metal, and a discharge at a high current density will become possible.

The Li alloy layer disposed between the solid electrolyte and the lithium metal anode in the present invention preferably consists of a Li alloy whose Li atom has a chemical diffusion coefficient of at least $10^{-8}$ cm$^2$/s at room temperature. Ordinarily, Li alloys whose Li atom has a chemical diffusion coefficient of up to about $10^{-6}$ cm$^2$/s can be obtainable. Examples of such Li alloys include a Li-Al alloy containing from 47 to 55 at% Li, a Li-Ga alloy containing from 45 to 56 at% Li, a Li-In alloy containing from 47 to 63 at% Li, a Li-Sb alloy containing from 75 to 85 at% Li, a Li-Bi alloy containing from 75 to 85 at% Li, and the like.

If the Li alloy layer in the present invention is below 0.1 μm thick, pin-holes or the like will be formed in the Li alloy layer due to corrugations resulting from the surface coarseness of the solid electrolyte, and the role of the Li alloy layer as the junction layer between the lithium metal anode and the solid electrolyte will be lost. If the thickness is above 10 μm thick, on the other hand, different phases having a low chemical diffusion coefficient of the Li atom will be formed in the Li alloy layer with repeating discharge and charge, and hence the role of the Li alloy layer with a large chemical diffusion coefficient will be lost. For these reason, the Li alloy layer is preferably from 0.1 to 10 μm thick.

Hereinafter, the present invention will be described in further detail with reference to preferred embodiments thereof.

EXAMPLE 1

Figure 1:
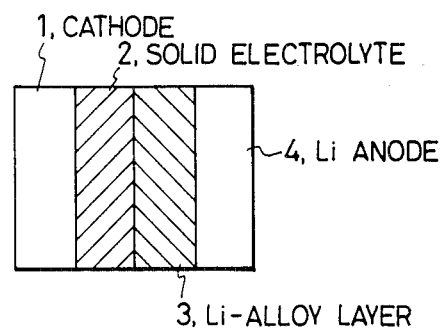
FIG. 1 is a schematic sectional view showing the construction of an all solid state Li battery in a first embodiment of the present invention.

FIG. 1 is a schematic sectional view showing an example of the construction of an all solid state lithium battery equipped with a Li alloy layer sandwiched between a solid electrolyte and a Li anode in accordance with the present invention. As depicted in the drawing, a cathode 1 consists of a 500 μm-thick pressed pellet of PbI$_2$ and Pb, while a solid electrolyte 2 consists of a 100 μm-thick pressed pellet of Li$_3$N. The following three kinds of all solid state Li batteries are produced by respectively forming 3 to 5 μm-thick, three kinds of Li alloy layers (A), (B) and (C) on the surface of the solid electrolyte 2 by an evaporation method. These Li alloy layers are (A) a Li-Al alloy layer containing 47 at% Li, (B) a Li-Ga alloy layer containing 45 at% and (C) a Li-In alloy layer containing 47 at% Li. Each layer is then pressed by applying a pressure of 1,500 kg/cm$^2$ between the cathode 1 and the Li anode 4 shown in FIG. 1. Thus, the three kinds of all solid state lithium batteries have the Li alloy layers (A), (B) and (C), respectively. The discharge property of each of these batteries is examined under an atmospheric pressure.

Figure 2:
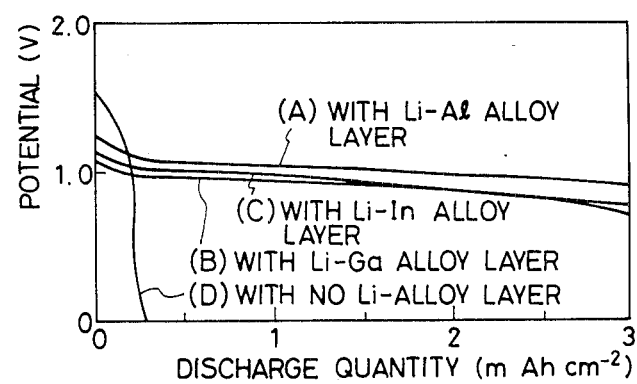
FIG. 2 is a diagram showing the relation between a potential and a discharge quantity at the time of discharge of the all solid state Li battery in the first embodiment.

FIG. 2 shows the relation between a potential (V) and a discharge quantity (mAh/cm$^2$) of the batteries having the Li alloy layers (A) through (C), respectively, and of a battery produced in the same condition as above but not having a lithium alloy layer (D), when discharge is effected at room temperature of 24° C. and at a current density of 1 mA/cm$^2$. As can be seen clearly from the diagram, the all solid state lithium batteries equipped with the Li alloy layers in accordance with the present invention exhibit extremely flat and stable discharge curves, though the potential somewhat drops at the initial stage, in comparison with the battery not equipped with the Li alloy layer. This means that the contact of the interface between the solid electrolyte and the Li anode becomes extremely good due to the formation of the Li alloy layer.

Incidentally, when all solid state Li batteries equipped with a Li-Al alloy layer containing 55 at% Li, a Li-Ga alloy layer containing 56 at% Li and a Li-In alloy layer containing 63 at% Li are produced in the same way as above, the resulting all solid state Li batteries exhibit substantially the same characteristics as the discharge characteristics of the batteries (A), (B) and (C) shown in FIG. 2 except for the difference of the potential drop due to alloying.

EXAMPLE 2

Figure 3:
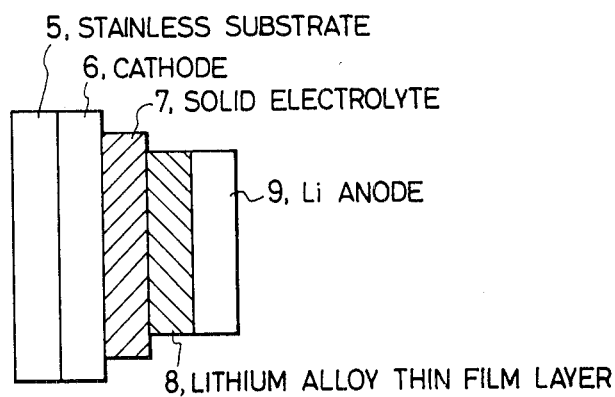
FIG. 3 is a schematic sectional view showing the construction of a thin solid film lithium battery in a second embodiment of the present invention.

FIG. 3 shows an example when a thin solid film lithium battery is formed in accordance with the present invention on the basis of a thin film formation process.

As shown in the drawing, a 100 μm-thick cathode 6 which is a TiS$_2$ film with crystallographic orientation is formed on the surface of a stainless substrate 5 by chemical vapor deposition, and a 10 μm-thick solid electrolyte 7 which is an amorphous thin film of Li$_{3.6}$Si$_{0.6}$P$_{0.4}$O$_4$ is formed on the cathode by sputtering.

Then, a 3 to 5 μm-thick Li alloy thin film layer 8, which is a Li-Sb alloy thin film layer containing 85 at% Li (E) or a Li-Bi alloy thin film layer containing 85 at% Li (F) is evaporated on the solid electrolyte 7. Furthermore, a 40 μm-thick Li anode 9 is deposited on the alloy layer by evaporation method, thereby constituting each thin solid film lithium battery.

Figure 4:
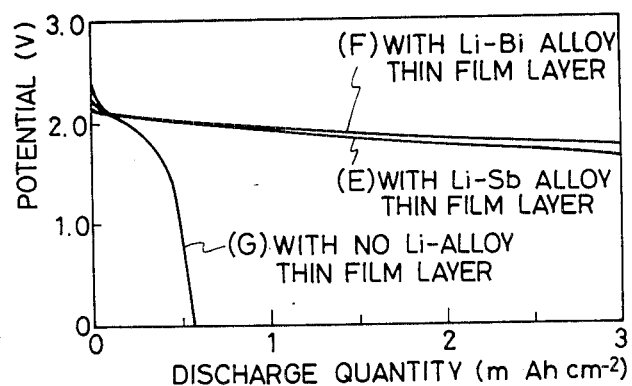
FIG. 4 is a diagram showing the relation between a potential and a discharge quantity at the time of discharge of the thin solid film lithium battery of the second embodiment.

FIG. 4 is a diagram showing the relation between a potential (V) and a discharge quantity (mAh/cm$^{-2}$) when each of the thin solid film battery equipped with the Li-Sb alloy thin film layer (E), the thin solid film battery equipped with the Li-Bi alloy thin film layer (F) and the thin solid film battery which is produced by the same thin film formation process but does not have the thin Li alloy layer (G), is discharged at room temperature of 30° C. and at a current density of 40 μA/cm$^2$. As can be seen clearly from the diagram, the thin solid film batteries equipped with the Li alloy thin film layer of the present invention on the interface between the solid electrolyte and the Li anode exhibit extremely flat discharge curves when compared with the thin solid film battery not equipped with the Li alloy thin film layer. This means that in the thin solid film lithium battery, too, the contact on the interface between the solid electrolyte and the Li anode is extremely good.

Incidentally, when thin solid film batteries equipped with a Li-Sb alloy thin film layer containing 75 at% Li and with a Li-Bi alloy thin film layer containing 75 at% Li, respectively, are produced by the same thin film formation process as in the embodiment described above, the resulting batteries have substantially the same performance as the batteries (E) and (F) except that the initial voltage drops by about 1 V, when compared with the discharge characteristics of the batteries (E) and (F) shown in FIG. 4.

As described in detail above, the all solid state Li battery in accordance with the present invention can establish a very good contact on the interface between the solid electrolyte and the Li metal anode by only disposing the Li alloy layer on the interface between the solid electrolyte and the Li anode without the necessity of the prior art for an additional mechanism for applying a high pressure, and can keep the good contact on the interface at the time of discharge of the battery at a high current density. Since a mechanism for applying high pressure is not necessary, it becomes possible to reduce both the size and thickness of the battery. Thus, the present invention provides an extremely great practical effect.

What is claimed is:

1. An all solid state lithium battery consisting of a cathode, a solid electrolyte and a lithium anode, said battery characterized in that a lithium alloy layer is formed between said solid electrolyte and said lithium anode.

2. The all solid state lithium battery as defined in claim 1 wherein a lithium alloy constituting said lithium alloy layer is a lithium alloy in which lithium atom has a chemical diffusion coefficient of at least $10^{-8}$ cm$^2$/s at normal temperature.

3. The all solid state lithium battery as defined in claim 1 or 2 wherein said lithium alloy constituting said lithium alloy layer is a member selected from the group consisting of a lithium-aluminum alloy containing 47 to 55 at% Li, a lithium-gallium alloy containing 45 to 56 at% Li, a lithium-indium alloy containing 47 to 63 at% Li, a lithium-antimony alloy containing 75 to 85 at% Li and a lithium-bismuth alloy containing 75 to 85 at% Li.

4. The all solid state lithium battery as defined in claim 3 wherein said lithium alloy layer is from 0.1 to 10 μm-thick.

5. The all solid state lithium battery as defined in claim 1, wherein said lithium alloy layer is from 0.1 to 10 μm-thick.

6. The all solid state lithium battery as defined in claim 2, wherein said lithium alloy layer is from 0.1 to 10 1 m-thick.

* * * * *